Figure 1:
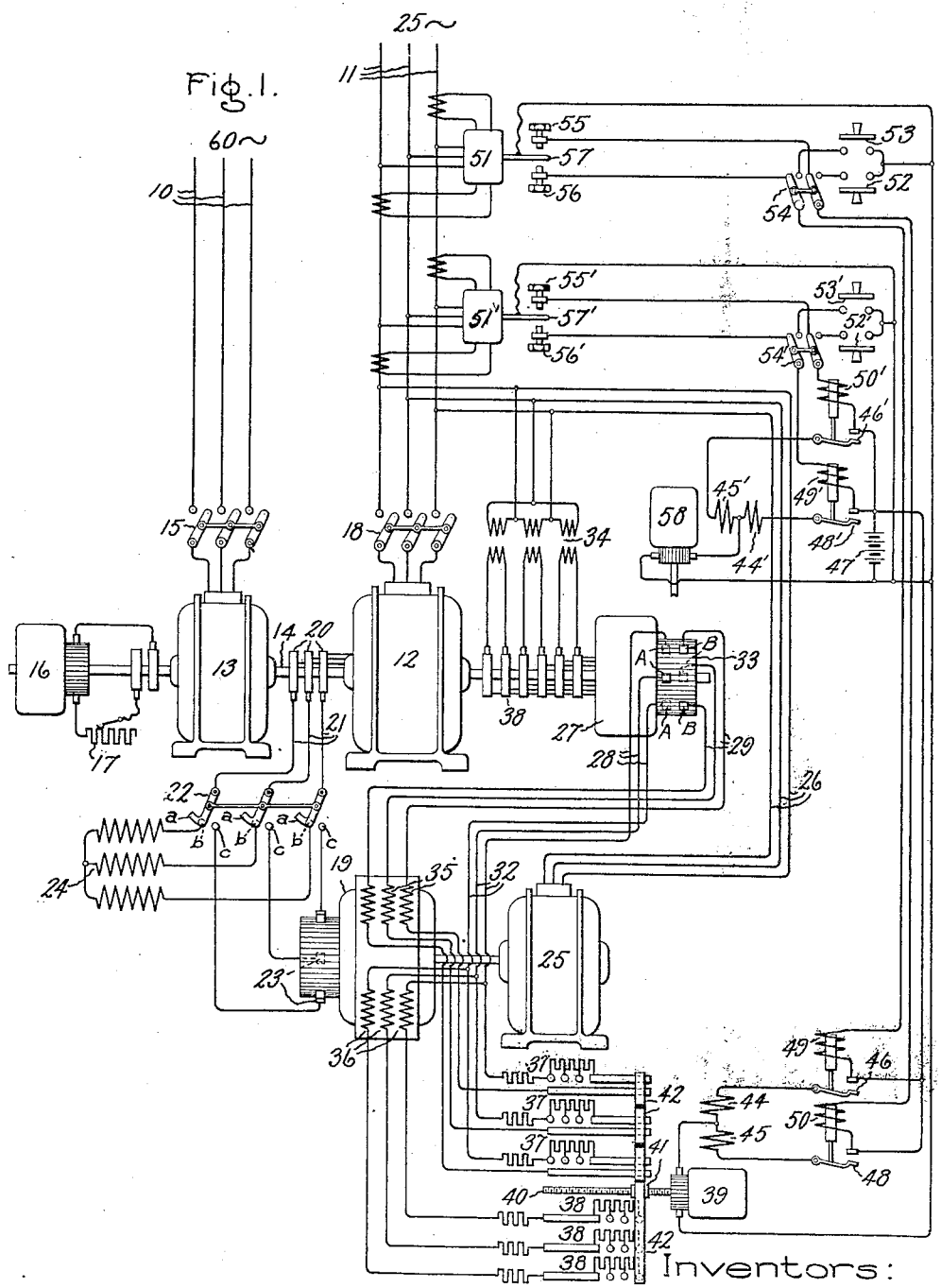

Inventors:
Percy W. Robinson,
John I. Hull,
by Charles V. Tullos
Their Attorney.

Patented Oct. 14, 1930

1,778,599

UNITED STATES PATENT OFFICE

JOHN I. HULL, OF SCHENECTADY, AND PERCY W. ROBINSON, OF SCOTIA, NEW YORK, ASSIGNORS TO GENERAL ELECTRIC COMPANY, A CORPORATION OF NEW YORK

SPEED AND POWER FACTOR CONTROL OF INDUCTION MACHINES

Application filed December 14, 1928. Serial No. 325,977.

Our invention relates to improvements in the excitation of regulating machines such as those employed in cascade with induction machines for the regulation of speed, load and power factor, and has for its primary object the provision of an exciting system which enables the power factor and load or speed of the induction machine to be controlled in a smooth and reliable manner. The invention is particularly beneficial in such applications as require the operation of induction machines through synchronism.

In a well known system of cascade control the secondary winding of the induction machine is excited from a commutator regulating machine having on its stator a phase winding excited from adjustable brushes of a commutator type frequency changer, often called an ohmic drop exciter. The phase windings on the stator of the regulating machine are not inter-connected but opposite ends of each phase are connected to two sets of adjustable brushes on the frequency changer commutator arranged in the same phase relation as the winding which they supply.

In some cases the intermediate regulating machine is dispensed with and the frequency changing commutator is made a part of the main induction machine and its secondary phase windings connected directly to the frequency changer brushes, as shown for example in Letters Patent No. 1,590,030. In either case, by adjusting the brushes connected to the opposite ends of a phase towards or away from each other we may vary the voltage supplied to the phase winding and thus vary the speed of the induction machine if it is a motor and the load if it is a generator and by shifting the brushes around the commutator in the same direction we may vary the power factor of the induction machine.

In accordance with our invention we have modified this arrangement by providing two stator windings which are excited from the frequency changer brushes, one connected as before mentioned and employed to supply the speed control excitation and, at speeds removed from synchronous speed, a part of the power factor correction excitation. One end of the phases of the other exciting winding are connected to only one set of brushes on the frequency changer, preferably one of the sets which supply the speed control excitation, and this second winding is employed to provide power factor excitation only. By thus dividing the exciting windings of the regulating machine a more satisfactory control is obtained particularly in the range close to and including synchronism.

In describing our invention we have illustrated its application to the control of an induction machine which constitutes one member of a frequency changer where the invention is particularly beneficial. Additional features of the invention regarding the control relation between the two excitations under changing conditions of load and speed will subsequently be brought out in the description.

Figure 2:
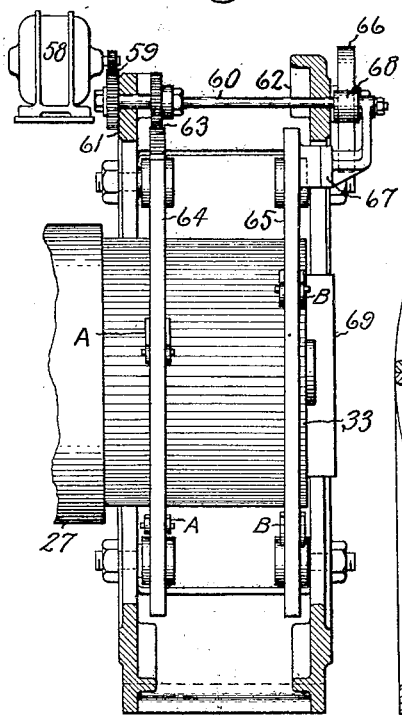
Figure 3:
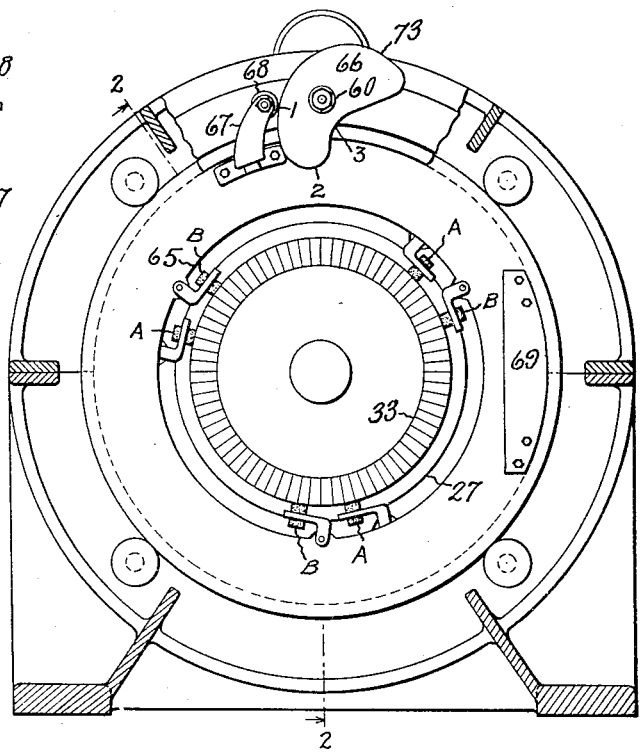
Figure 4:
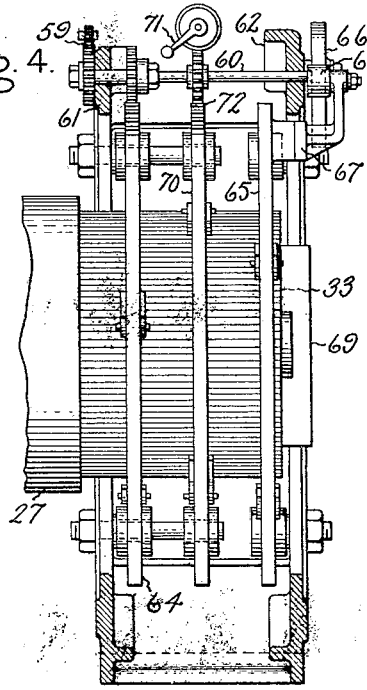
Figure 5:
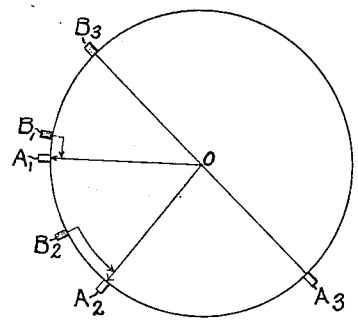

The features of our invention which are believed to be new and patentable will be pointed out in the claims appended hereto. For a better understanding of the invention reference is made to the following drawings in which Fig. 1 represents a preferred arrangement of the apparatus and connections therefor; Fig. 2 illustrates the means of shifting the brush yokes on the machine used as a frequency changing exciter. Fig. 3 shows the means used for varying the magnitude and phase angle of the voltages supplied by the frequency changing exciter; Fig. 4 represents a third brush yoke that may be employed on the commutator of the frequency changing exciter to supply a voltage for power factor excitation; and Fig. 5 illustrates vectorially the voltages used for load and power factor control as the brushes on the frequency changing exciter are rotated with the apparatus of Fig. 3.

Referring to Fig. 1, 10 and 11 represent alternating current distribution systems of different frequencies, for example 60 and 25 cycles. The main machines of the converter set are represented by 12 and 13. They are represented as having their rotating parts on the same shaft 14. For the frequency given the machine 13 may comprise a 10-pole synchronous machine connected to the 60 cycle supply system by the switch 15. The rotating field of the synchronous machine is excited by a direct current exciter 16 mounted on the same shaft 14 and connected through the variable resistance 17. The synchronous speed of the machine will be 720 R. P. M. and will determine the speed of the set. We have represented machine 12 as being a 4-pole induction machine connected to the 25 cycle supply system 11 by means of switch 18. The synchronous speed of the induction machine for the conditions named is 750 R. P. M. but it may readily be made to run either as a motor or generator at 720 R. P. M. by means of the control device which will subsequently be described.

The stator of the induction machine 12 is connected to the supply system 11. The rotor winding is arranged to be connected to the regulating machine 19, the connections being made through the slip rings 20, lines 21, switch 22 and brushes 23 to the commutator of the regulating machine 19. The switch 22 is arranged to disconnect the regulating machine 19 from the induction machine 12 and connect the starting resistance 24 in series with the rotor of the induction machine, thus allowing it to start as an ordinary induction motor. With the switch in the position shown the resistance 24 is connected in series with the rotor circuit of the induction machine 12. Arrangements are made for swinging the lower portion $a$ of the switch to the right so as to connect the terminals $b$ and $c$ together, thus conecting the regulating machine 19 and resistance 24 in parallel. By moving the portion $a$ of the switch farther to the right the terminals $b$ are disconnected, thus disconnecting the starting resistance 24 and connecting the regulating machine 19 in series with the rotor circuit of the induction machine 12. The commutator machine 19 is directly connected to an alternating current electric motor 25. The motor 25 which drives the commutator machine is electrically connected to the same supply system 11 as the induction machine 12 by connection 26. The field windings 35 and 36 of the regulating machine 19 are excited through the connections 29 and 28 and brushes B and A from the commutator 33 of a frequency changing exciter 27 mounted on shaft 14 of the frequency converter set. The brushes A and B are located in adjustable brush yokes as illustrated in Figs. 2 and 3. The winding 35 of the commutator machine 19 is connected across the brushes A and B while the winding 36 is connected to only one set of brushes, namely that set designated by the reference character A. The rotating member of the frequency changing exciter 27 is fed from the supply source 11 of the induction machine 12 through suitable step down transformers 34.

In addition to the main exciting winding 35, which is used to regulate the speed of the induction machine 12, we have provided a separate power factor winding 36 preferably in the same slots with the main exciting winding 35. By connecting the winding 36 to the brushes A on one of the brush yokes as illustrated in Fig. 2, the magnitudes of the voltage impressed on this winding and resistance 38 in series therewith is not changed by shifting the brushes although such adjustment will change the phase relation. When the brushes on the frequency changing exciter are shifted so that the speed of the induction machine is near synchronism in the manner well known to the art, the voltage in the excitation winding 35 is zero or of a small value. The winding 36 referred to as the power factor winding is used for securing a quadrature component of rotation voltage from the commutator machine at and near synchronous speed for correcting the power factor of the induction machine. Rheostat 38 is used in the power factor winding circuit to control the amount of current allowed to flow in said winding at different speeds. The capacity of this winding 36 and rheostat 38 is made large enough to allow development of the desired amount of excitation for the low slip frequency conditions at and near synchronism, but its effectiveness is rapidly reduced as the speed of the main induction machine 12 is increased or decreased away from synchronism.

It is well known that as the speed of the induction motor is increased or decreased away from synchronism the slip voltage of the secondary of the induction motor 12 will be increased, thus it will be necessary to supply a greater voltage to correct its power factor. If provisions were made to supply the power factor winding 36 with a voltage sufficient to provide for all the desired power factor correction at speed points far from synchronism it would be possible by careless operation to set up dangerous values of wattless current in the induction motor and commutator machine and excessive power factor correction at speeds near synchronism, consequently we have made provision for using the voltage of the main exciting winding 35 for the greater part of the power factor correction at speeds remote from synchronism. This is provided for by using a rheostat 37 connected in series with the main exciting winding to vary the ratio of the resistance to the inductance of these circuits and thus control the phase of the exciting currents. As the variation of the resistance in the circuit of the main exciting winding 35 near synchronous speed has considerable effect on the speed of the induction motor 12 as well as on its power factor the two rheostats are so arranged as illustrated in the diagram that the resistance 38 in the power factor winding circuit is reduced to a minimum before any variation in the resistance 37 is allowed. This will be better understood by reference to the arrangements made for varying the resistances 37 and 38 as illustrated in the diagram.

In the drawing is illustrated a pilot motor 39 showing the windings and connections for opposite directions of rotation which will subsequently be explained. We have represented the shaft 40 of the motor as being threaded and screwed into a nut 41. This nut is rigidly fastened to a rod 42 having insulated contactors cooperating with the various sections of the rheostats. It may be noted the power factor winding is connected to the brushes A on the frequency changing exciter 27, the other end being connected to a Y point through the resistance 38. The rod 42 is so constructed as to connect the resistances 37 and 38 respectively in series with the main exciting winding 35 and power factor winding 36 of the commutator machine 19. It will be noted that we have represented the rod 42 as being connected by means of the nut 41 to the shaft of the motor 39, but it will be obvious that other equivalent arrangements may be employed. As the motor is rotated the shaft 40, by turning in the nut 41, causes the rod 42 to move across the resistances 37 and 38, thus alternately increasing or decreasing the resistances. As illustrated in the diagram the rheostat in the power factor winding circuit will be reduced to a minimum before the resistance of the main exciting winding is effected, thus obtaining the full effect of the power factor winding 36 before the resistance in the main exciting winding 35 is varied. We have found this to be desirable as any variation in the resistance of the main exciting winding has a considerable effect on the speed of the motor when near synchronism.

The movable elements of the two rheostats shown and described are mechanically connected and may be controlled either manually or automatically. In practical application we have found it desirable to use the automatic control. The motor illustrated in the diagram employed to move the rod 42 so as to increase or decrease the resistance of the circuits is represented as being of the direct current type with series fields 44 and 45. The armature of the motor is adapted to be connected through field coil 44 and a contactor 46 to a source 47 for operating the motor in one direction and through field coil 45 and contactor 48 to the source 47 for operation in the reverse direction.

The contractors 46 and 48 are provided with operating solenoids 49 and 50 which are arranged to be controlled either automatically as by a contact making meter 51 or manually as by switches 52 and 53. The source 47 is utilized for energizing the solenoids 49 and 50 and one terminal of each coil is permanently connected to the source 47. The other terminals of the coils are respectively connected to the blades of a double-pole double-throw switch 54. When the switch is thrown to the left as illustrated, solenoids 49 and 50 are connected to the permanent connections 55 and 56 of the contact making meter 51. The movable contact 57 of the meter is arranged to cooperate with the stationary contacts 55 and 56 and close the circuit of either solenoid 49 or 50, thus closing the contactors 46 or 48 and exciting fields 44 or 45 and causing the motor to operate in either direction according to the contact made. The meter 51 in the present case may be connected so as to be responsive to reactive K. V. A. and thus the meter will operate to keep a constant value of reactive K. V. A. flowing through the induction motor 12 irrespective of the power factor or if 51 is a power factor meter it will operate so as to maintain a constant power factor on the induction motor 12 irrespective of the value of the reactive current. Of course the contact device 57 of the meter can be adjusted to make connections to either of the stationary connections 55 or 56 so as to hold any value of reactive current or power factor within the range of the apparatus.

When the switch 54 is thrown to the right the circuits of the operating solenoids will be connected through the manually operated control switches 52 and 53, the motor 39 operating in one direction if switch 52 is closed so as to close the contactor 48 and excite field 45, and reversing its direction of rotation if the switch 53 is closed so as to close the contactor 46 and excite field 44. It will now be evident that the control of the motor 39 may be effected either automatically by the contact making meter 51 or by the manually operating switches 52 and 53.

We have shown a motor 58 which is used to shift the brushes on the frequency changing exciter 27, to be the same type of motor as represented by the number 39. The armature of the motor 58 is adapted to be connected through the field coil 45', contactor 46' to the source 47 for operating in one direction and through the field 44', contactor 48' and the source 47, for operating in the reverse direction. The contactors 46' and 48' are provided with operating solenoids 50' and 49' which are arranged to operate in response to the contacts made by the contact making wattmeter 51' to the stationary connections 55' or 56' when the switch 54' is thrown to the left as in the position illustrated. When the switch 54' is thrown to the right the solenoids 49' and 50' are caused to operate by opening and closing the manually operated switches 52' and 53'. The principles of operation and the means used in causing the motor to operate in opposite directions are the same as explained in connection with the motor 39. It is evident that by suitably adjusting the contacts 55' and 56' the meter 51' will operate to shift the brushes on the frequency changer so as to limit the load interchange between the two frequency systems.

In Fig. 2 we have shown the brushes A and B on the commutator 33 of the frequency changing exciter 27 connected to brush yokes 64 and 65 and the means used for shifting the brushes. The shaft of the pilot motor 58 is connected through mesh gears 59 to a drive shaft 60. The drive shaft 60 is supported by suitable bearings 61 and 62 and connected through mesh gears 63 to brush yoke 64. The brush yoke 64 is arranged to rotate in either direction according to the direction of rotation of the shaft 60. Thus it will be seen that the brushes on yoke 64 may be shifted in the desired direction by causing the motor to rotate in corresponding directions as explained above.

The brush yoke 65 is rotated by means of a cam 66 rigidly fastened to the drive shaft 60. By referring to Fig. 3 it will be seen that a projection 67 is extended from the brush yoke 65 and carries a roller 68, the roller resting against the contour of the cam 66. A weight 69 is attached to the brush yoke 65 so as to always hold the roller 68 against the contour of the cam 66.

I have represented the contour of the cam 66 by the line 73. It will now be evident that by rotating the shaft 60 the cam 66 will rotate, thus shifting the brushes on brush yoke 65 according to the contour of the cam. It will be obvious that the desired contour of the cam will depend upon the effect of resistance 37 and the gear ratio between 63 and 64, the shape shown in the diagram is only for the purpose of illustration.

The position of the brushes A and B on the commutator 33 as shown in Fig. 2 can be best understood by reference to the vector diagram shown in Fig. 5. As illustrated and explained in connection with Fig. 1 the power factor winding 36 is connected to the brushes represented by A and to a Y point on the resistance 38 so there will be a constant voltage impressed on the winding 36 and the resistance 38 connected in series therewith as represented by the vectors $OA_1$, $OA_2$ and $OA_3$. The vectors $A_1 B_1$, $A_2 B_2$ and $A_3 B_3$ represent the difference in potential between the brushes A and B on the brush yokes 64 and 65 shown in Fig. 2 for different speed adjustments.

The contour of the cam 66 is so designed that when the roller 68 is in position 1 shown in Fig. 3 the brushes A and B are on different commutator segments. With the brushes in the position shown the magnitude of the voltage between the brushes may be represented by the vector between the brushes $A_1 B_1$ shown in Fig. 5. If we assume now that the cam is rotated in a clockwise direction and the vector diagram of Fig. 5 is made to represent successive positions of the brushes when the cam is so rotated the corresponding positions of the roller 68 on the cam 66 may be designated by the corresponding reference characters 2 and 3. As the cam is rotated, brushes A on the brush yoke 64 will first move in the same direction as the brushes B on the brush yoke 65, but at a different angular velocity so when the roller 68 has reached the point 2 indicated on the cam 66 their positions will be $A_2 B_2$ as illustrated in Fig. 5. At this point the direction of rotation of the brushes B will be reversed and when the cam 68 has so moved that the roller 68 rests upon the contour of the cam at point 3 the voltage vector relation between the brushes A and B will be $A_3 B_3$ as illustrated by the vector diagram of Fig. 5. If the cam 66 is rotated in a counter-clockwise direction from the position 1 shown in Fig. 3, the brushes A and B will be rotated in opposite directions and pass each other when the roller 68 has reached a given point on the contour of the cam 66. When the brushes A and B pass each other, that is, when they are caused to rest on the same commutator segment it is well known there will be no potential difference between them. Thus it will be seen that the voltage impressed on the main exciting winding 35 may be regulated from zero to its maximum value by rotating the brushes in the manner described above and there will always be a constant voltage of relatively varying phase relation impressed on the winding 36 and resistance 38 in series as illustrated by the vectors $OA_1$, $OA_2$ and $OA_3$.

Consider now the condition when the brushes of the brush yokes 64 and 65, illustrated in Fig. 2, are so shifted that no excitation is supplied to the main exciting winding 35 of the machine 19, and the main induction machine 12 runs at or near synchronous speed. If the rheostat 38 is adjusted to its minimum resistance value, current will flow in the power factor winding 36 and the resulting ampere turns will produce a field flux in the commutator machine 19 of such phase as to set up a rotation voltage in quadrature to that required to regulate the speed, thereby furnishing power factor correcting excitation to the induction motor through its rotor. The minimum value of resistance may be made sufficient to limit the wattless exciting current to a safe value, thus making it impossible to produce dangerous values of wattless current by careless manipulation of the power factor control devices.

When the speed of the induction machine 12 is increased or decreased away from synchronous speed, the slip frequency of the machine is increased so that a greater voltage is required from the commutator machine for power factor improvement. This is provided for by decreasing the resistance in the main exciting winding by means of rehostat 37, thus causing it to supply additional quadrature excitation required for power factor correction at such speeds. A further advantage in using rheostat 37 in the circuit of the main exciting winding 36 is that by decreasing the resistance 37 the magnitude of the voltage supplied to the secondary of the main induction machine 12 is increased, which is necessary when the power factor of this machine is improved.

Particular combinations of required speed and power factor regulation may make it desirable to connect the power factor winding to a third set of brushes, such for example as illustrated in Fig. 4, the additional brush yoke being represented at 70. The brush yoke 70 may be either stationary or movable. We have represented a lever 71 being connected through gears 72 to the brush yoke 70 so that it can be rotated if desired, but it will be obvious that any other well known means may be used. The other parts of Fig. 4 are similar to the parts illustrated and described in connection with Fig. 2 and I have represented them by like numbers.

In accordance with the provisions of the patent statues, we have described the principle of operation of our invention, together with the apparatus which we now believe to represent the best embodiments thereof, but we desire to have it understood that the apparatus shown and described is only illustrative and that the invention may be carried out by other means.

What we claim as new and desire to secure by Letters Patent of the United States, is:

1. In combination with a dynamo electric machine having primary and secondary windings of a source of alternating current supply for said primary windings, an alternating current commutator machine interconnected with said secondary winding, said commutator machine having two excitation windings, current adjusting means associated with each of said windings, means for automatically varying said current adjusting means in response to variations in the reactive current imposed upon said dynamo electric machine, a frequency changing exciter having adjustable brushes electrically interconnected with said excitation windings for supplying excitation to said commutator machine at a frequency proportional to slip frequency of the dynamo electric machine, and means for shifting the brushes of said frequency changing exciter.

2. In combination, an alternating current machine having primary and secondary windings, of a source of alternating current supply for said primary winding, a commutator machine connected in cascade with said secondary winding, said commutator machine having two exciting windings, a frequency changing exciter having adjustable brushes for providing excitation for said windings, connections between the windings and brushes and means for adjusting said brushes so as to vary the voltage impressed upon one winding only.

3. An alternating current machine having primary and secondary windings, said primary winding being connected to an alternating current supply system, an alternating current commutator machine interconnected with said secondary winding, said commutator machine having two exciting windings, a variable resistance being connected in the circuit with each of said exciting windings, a frequency changing exciter having two adjustable sets of brushes for supplying said exciting windings with a voltage at a frequency proportional to the slip frequency of said alternating current machine, one of said exciting windings being connected across the two adjustable sets of brushes of the frequency changing exciter, the other winding being connected to only one set of such brushes and means for adjusting the two sets of brushes.

4. A dynamo electric machine having primary and secondary windings, the primary winding of said machine being connected to an alternating current supply system, a commutator machine connected in cascade with the secondary winding of said first mentioned machine, said commutator machine having two exciting windings, each exciting winding having in its circuit a variable resistance, a frequency changing exciter having adjustable brushes for exciting said windings at a frequency proportional to the slip frequency of said first mentioned machine, automatic means controlling said resistances and automatic means adjusting said brushes for controlling the excitation supplied to said commutator machine to thereby control the said dynamo electric machine.

5. An asynchronous type dynamo electric machine having primary and secondary windings, the primary winding being connected to an alternating current supply system, a commutator machine connected to the secondary winding, said commutator machine having two exciting windings, a variable resistance connected in the circuit of each of said exciting windings and automatic means for varying the resistances in response to the power factor condition of said first mentioned machine, a frequency changing exciter with adjustable brushes for supplying exciting windings of the commutator machine with voltage at a frequency proportional to the slip frequency of said asynchronous machine, and means for shifting the brushes of said frequency changing exciter so as to vary the load on said asynchronous machine, the control of the resistances in said windings serving to modify the power factor of said asynchronous machine.

6. An alternating current machine having primary and secondary windings, the primary winding being connected to a supply system, a commutator machine connected to the secondary of said first mentioned machine, said commutator machine having two exciting windings, a variable resistance being connected in the circuit of said exciting windings, a frequency changing exciter having two adjustable sets of brushes connected to supply excitation current to the windings of said commutator machine, and means for shifting the brushes on said frequency changer exciter so as to vary the magnitude of the voltage impressed on one exciting winding and the resistance connected in series therewith and to vary the phase of the voltage impressed on the other exciting winding circuit.

7. An alternating current machine having primary and secondary windings, said primary winding being connected to an alternating current supply system, a commutator machine interconnected with the secondary winding, a frequency changing exciter with adjustable brushes for supplying excitation to said commutator machine at a frequency proportional to the slip frequency of the first mentioned machine, a brush shifting device for said frequency changing exciter comprising two brush yokes, a shaft connected to one of said brush yokes by means of gears and a cam on the shaft operably associated with the other of said brush yokes whereby said yoke is rotated according to the contour of said cam when the other brush yoke is moved through said gears, an exciting winding on the commutator machine connected to brushes on both yokes and another exciting winding on the commutator machine connected to brushes on one yoke only.

8. An alternating current commutator machine having two exciting windings, a frequency changing exciter for supplying excitation voltage to said windings, said frequency changer having two sets of adjustable brushes, one of said exciting winding being connected in series with a resistance and across the two sets of adjustable brushes and the other exciting winding being connected in series with a resistance and to only one set of said brushes.

9. In a regulating system for alternating current dynamo electric machines, a machine provided with two exciting windings, a frequency changing commutator, a plurality of sets of adjustable brushes on said commutator, connections between one of said exciting windings and different sets of brushes on said commutator, and connections between the other exciting winding and a single set of brushes on said commutator.

10. In a regulating system for alternating current dynamo electric machines, a machine provided with two exciting windings, a frequency changing commutator, adjustable brushes on said commutator, connections between said brushes and exciting windings and means for adjusting said brushes so as to supply one winding with a voltage which varies in magnitude and the other winding with a voltage of constant magnitude but which varies in phase.

11. In combination, a main dynamo electric machine of the asynchronous type having relatively rotatable windings, one winding being connected to an alternating current system and an alternating current commutator machine connected to the other winding, two exciting windings on the commutator machine, one of said windings being employed primarily for controlling the magnitude of the load excitation supplied to the main dynamo electric machine and the other winding being employed primarily for power factor regulation, a commutator type frequency changer connected to supply excitation to said two exciting windings, adjustable current varying means included in the two exciting winding circuits and automatic means responsive to the power factor condition of the main dynamo electric machine for adjusting said current varying means.

12. In a regulating system for alternating current dynamo electric machines, a commuator machine provided with two exciting circuits, a commutator type frequency changer provided with a plurality of adjustable sets of brushes for energizing said exciting circuits, electrical connections between said exciting circuits and said adjustable sets of brushes, and means for shifting said adustable sets of brushes so as to impress a variable voltage on one of said exciting circuits, and to impress on the other of said exciting circuits a substantially constant voltage, the said means comprising a plurality of movable brush yokes to carry said sets of brushes, one of said yokes having spaced teeth and another of said yokes having a projection, a roller assembled on said projection, a rotatable shaft carrying a toothed gear in mesh with said teeth and a cam whose contour is in contact with said roller, means to retain said cam contour in contact with said roller, and means for rotating said shaft in either direction.

13. In a regulating system for alternating current dynamo electric machines, a commutator machine provided with two exciting windings, adjustable resistances in series with each of said exciting windings, and a common operating member for said adjustable resistances having different operating ranges for the different resistances, whereby only one of said resistances is adjustable at a time.

In witness whereof we have hereunto set our hands this 13th day of December, 1928.

JOHN I. HULL.
PERCY W. ROBINSON.